Oct. 19, 1965 W. J. PENDY, JR., ETAL 3,213,236
MOTOR OPERATING MECHANISM FOR OPERATING CIRCUIT INTERRUPTERS
Filed May 21, 1963

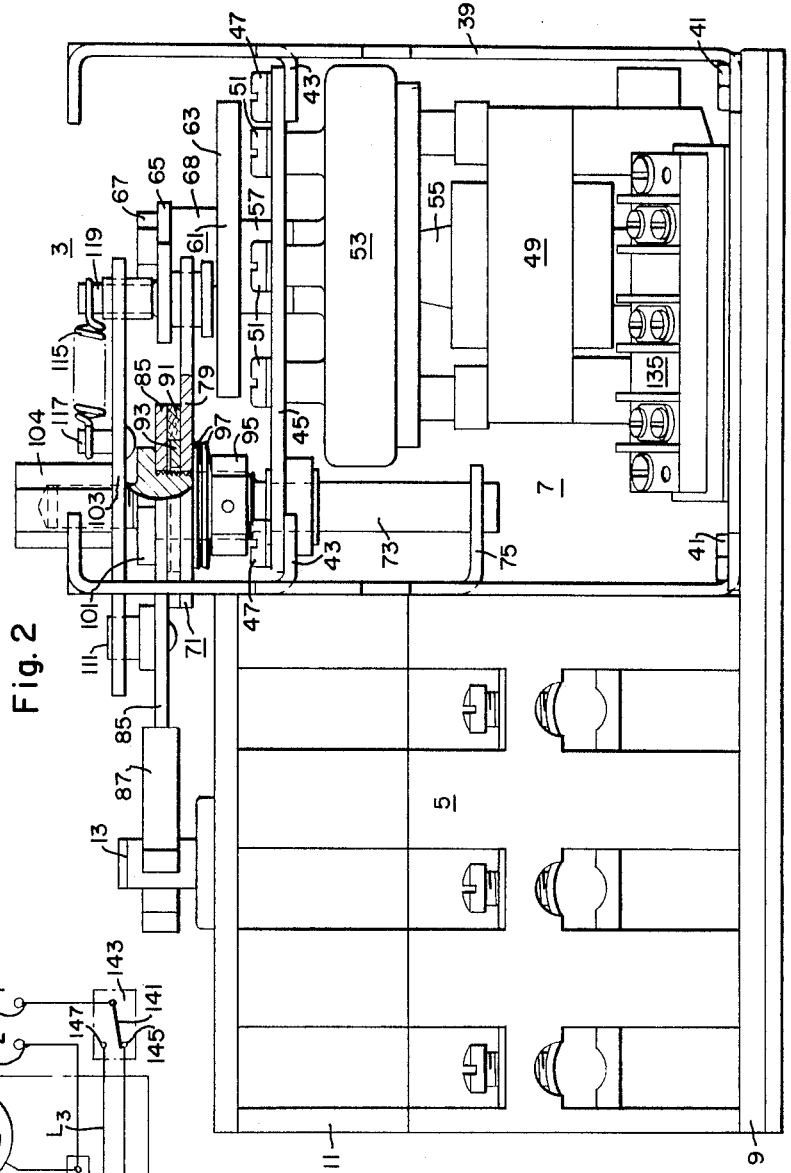
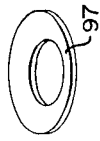
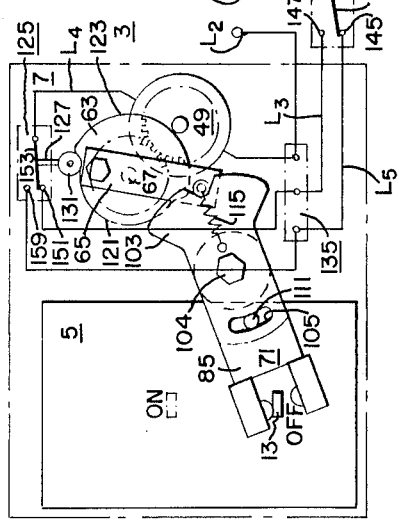
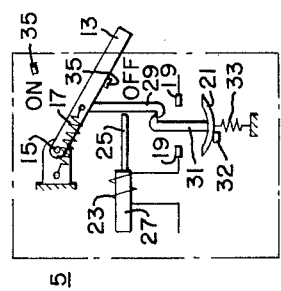

United States Patent Office 3,213,236
Patented Oct. 19, 1965

3,213,236
MOTOR OPERATING MECHANISM FOR
OPERATING CIRCUIT INTERRUPTERS
William J. Pendy, Jr., and Louis N. Ricci, Beaver Falls,
Pa., assignors to Westinghouse Electric Corporation,
Pittsburgh, Pa., a corporation of Pennsylvania
Filed May 21, 1963, Ser. No. 282,074
10 Claims. (Cl. 200—92)

This invention relates generally to mechanisms for operating circuit interrupters and more particularly to motor operating mechanisms for operating circuit interrupters.

A general object of this invention is to provide an improved mechanism for operating circuit interrupters.

Another object of this invention is to provide an improved motor operating mechanism for operating circuit interrupters, which mechanism comprises improved means for selective manual operation of the circuit interrupters.

In the art of motor operating mechanisms for circuit interrupters or circuit breakers, it is desirable to provide friction-type coupling means in the mechanism, which coupling means will slip when the interrupter handle reaches the operated position to thereby prevent damage to the handle. With the provision of friction coupling means the motor operating mechanism can be constructed to drive a greater distance than the handle travel of the circuit interrupter. Thus, the driving distance of the mechanism is less critical so that the mechanism can be field mounted to operate a variety of different circuit interrupters. It is also desirable to provide for manual operation of the circuit interrupter. There is disclosed and claimed an operating mechanism, comprising friction coupling means, in the copending patent application Serial No. 201,373, filed June 11, 1962 and assigned to the assignee of the subject application. In this structure an operator can manually operate the circuit interrupter by forcefully over-riding the friction coupling means. As the operating force required for operating various circuit interruptes is inceased, the amount of fiction required for effective operation of the friction-type coupling means is increased to thereby make it more difficult to manually operate the structure by forcefully over-riding the friction-type coupling means.

Accordingly, another object of this invention is to provide an improved motor operating mechanism with friction-type coupling means and means provided for selective manual operation of the mechanism without requiring a forceful overriding of the friction-type coupling means.

A further object of this invention is to provide an improved motor operating mechanism with improved means for operating a circuit breaker of the molded-case type either by operation of the motor or manually without damaging the external operating handle of the circuit breaker.

Another object of this invention is to provide an improved motor-operating mechanism that can be mounted along side of various standard molded-case type circuit breakers, which mechanism is not substantially longer, wider or higher than the molded-case circuit breakers, whereby the mechanism can be conveniently mounted in a standard panelboard or enclosure.

A further object of this invention is to provide an improved combination comprising a circuit interrupter and a mechanism for operating the circuit interrupter.

The novel features that are considered characteristic of this invention are set forth in particular in the appended claims.

The invention itself, however, both as to structure and operation, together with additional objects and advantages thereof, will be best understood from the following detailed description of a preferred embodiment thereof when read in conjunction with the accompanying drawings, in which:

FIG. 2 is a side view, partly in section, of the apparatus seen in FIG. 1;

FIG. 3 is a diagrammatic view of the apparatus seen in FIG. 1, illustrating the control circuits for the apparatus;

FIG. 4 is a schematic view of part of the mechanism of the circuit breaker seen in FIGS. 1–3;

FIG. 5 is a perspective view of one of the spring washers seen in FIG. 2;

Figure 1:
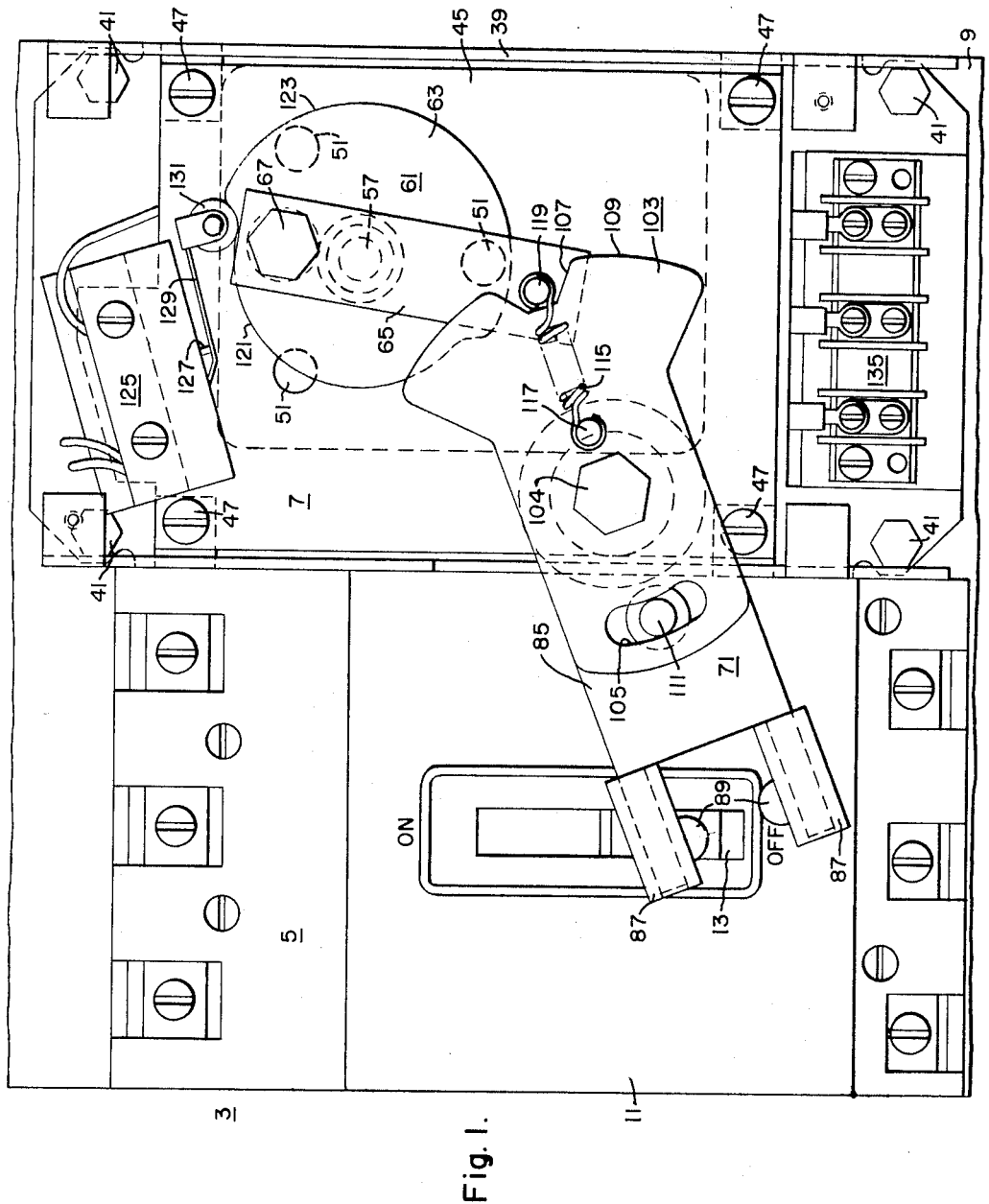
FIGURE 1 is a plan view of a circuit-interruptnig apparatus constructed in accordance with the principles of this invention.

Referring to the drawings, and patricularly to FIGS. 1 and 2, there is shown therein a circuit interrupting apparatus 3 comprising a circuit breaker 5 and a motor operating mechanism 7, both of which structures are suitably supported on a supporting plate 9. The disclosed circuit interrupter 5 is of the type known in the art as a molded-case circuit breaker since it comprises an insulating housing 11 of molded insulating material and an external handle 13 extending from the housing 11 and manually movable between two operating positions to open and close the contacts within the housing 11. Means are provided in the housing 11 for automatic tripping of the circuit breaker 5. The circuit breaker 5 may be of the type disclosed in the patent to Robert H. Hill et al., Pat. No. 3,073,927, issued January 15, 1963. Since the circuit breaker is fully described in the above-mentioned patent, only a schematic drawing and a brief description thereof is given herein.

As is shown schematically in FIG. 4, the handle 13 of the circuit breaker 5 is moved about a pivot 15 to move a spring 17 over center to effect opening and closing of the contacts 19, 21 in a well known manner. When the contacts 19, 21 are in the closed position and an overload current passed through a coil 23, a plunger 25 of a solenoid 27 is moved to the right (FIG. 4) to pivot a latch member 29 to unlatch a contact arm 31 that carries the movable contact 21, whereupon a spring 33 operates to open the contacts 19, 21. The contact 21 is stopped in the open position by means of a stop 32. The circuit breaker is reset by moving the handle 13 to the "off" position to relatch the latch member 29 with the contact arm 31. The circuit breaker is trip-free in that even if the handle 13 is held in the closed position, the circuit breaker will still be tripped open upon the occurrence of an overload current through the breaker. Stop means 35 are provided to limit movement of the handle 13 in both directions.

The motor operating mechanism 7 is provided to operate the circuit breaker 5. The motor operating mechanism 7 comprises a generally U-shaped metallic supporting bracket 39 that is secured to the supporting plate 9 by means of bolts 41. Four bent-over support flanges 43 are formed in the plate 39 by means of a stamping operation. A supporting plate 45 is supported on the flanges 43 by means of bolts 47. A undirectional motor 49 is supported on the plate 45 by means of bolts 51. The motor 49 is provided with a gear box 53 operated by means of the motor drive shaft 55 to operate a main shaft 57.

The motor 49 is operated to rotate a driving structure 61 that comprises a cam-and-drive member 63 fixed to the output shaft 57 and a link 65 pivotally supported on the cam-and-drive member 63 by means of a pin 67, the lower part of which is disposed within a spacer 68 (FIG. 2).

Figure 7:
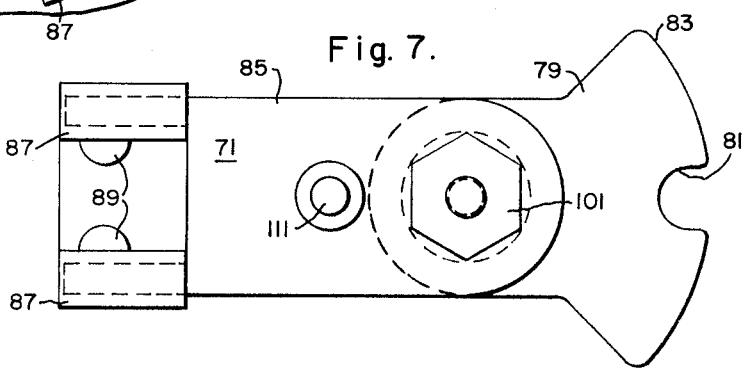
FIG. 7 is a plan view of the driven structure seen in FIGS. 1 and 2.

In addition to the driving structure 61, the motor operating mechanism 7 comprises a driven structure 71 (FIGS. 7 and 8) that is rotatably supported on another shaft 73 (FIG. 2) which shaft 73 is rotatably supported on a bent-over part 75 of the supporting bracket 39 and also on the plate 45. The driven structure 71 comprises a drive arm 79 that is rotatably supported on the shaft 73 and has a notch 81 and an outer edge 83 provided at the outer end thereof. The driven structure 71 also comprises a connecting arm 85 that is rotatably supported on the shaft 73 (FIG. 2) and is provided with two outer arms 87 that form a claw for operating the handle 13 of the circuit breaker. The outer arms 87 comprise a suitable resinous material having semi-spherical buttons 89 to provide for better operating contact with the operating handle 13.

Figure 8:
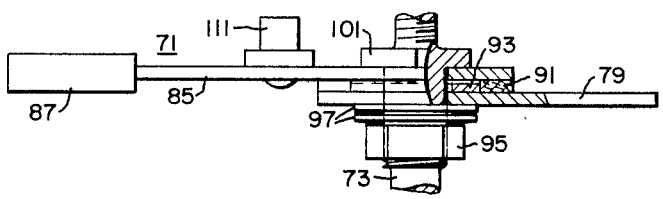
FIG. 8 is a side view partly in section of the structure seen in FIG. 7.

Friction-coupling means are provided to operatively connect the drive arm 79 and the connecting arm 85. As is best seen in FIG. 8, a friction disc 91 of asbestos or other suitable material is disposed over the shaft 73 between the members 79 and 85 adjacent flat faces of the members 79 and 85. A washer 93 having a thickness less than the disc 91 is positioned on the shaft 73 concentrically with the friction disc 91. A nut 95 that is threadedly secured on a threaded part of the shaft 73 beneath two spring-washers 97 (one of which is seen in perspective in FIG. 5). The nut 95 is rotated to flex the spring washers 97 and to apply a force biasing the members 79, 91, 85 upward, which movement is prevented by engagement of the member 85 with a shoulder member 101 formed on the shaft 73, so that the force of the charged spring washers 97 forces the members 79, 91 and 85 together. During operation of the apparatus 3, the driven structure 85 is rotated as a unit with the shaft 73.

Figure 6:
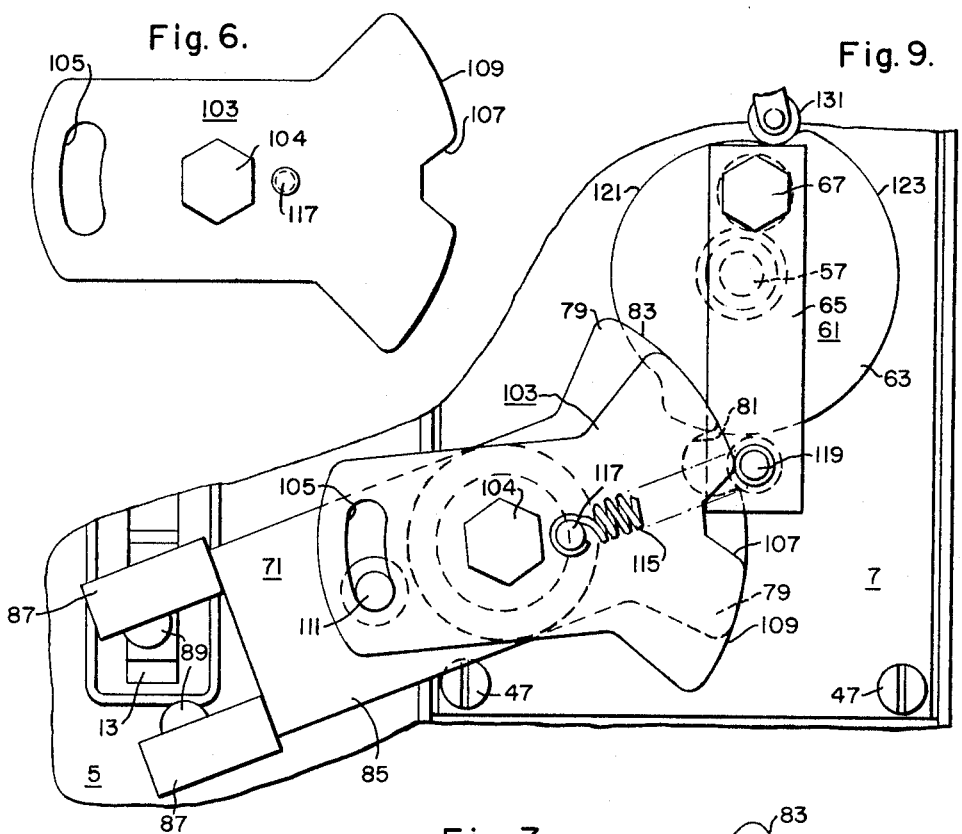
FIG. 6 is a plan view of the manually operable member seen in FIGS. 1 and 2.

In addition to the driving structure 61 and the driven structure 71, the motor operating mechanism 7 comprises a manually operable member 103 (FIGS. 1, 2 and 6). The manually operable member 103 is secured on the shaft 73 for rotation relative to the shaft 73, by means of a member 104 having a polygonal outer surface to cooperate with a suitable wrench type tool. The manually operable member 103 is provided with a slot 105 at one end thereof and a notch 107 and outer edge 109 at the other end thereof. As can be seen in FIGS. 1 and 2, a pin 111 that is rigidly secured to the connecting arm 85, is disposed in the slot 105 in the manually operable member 103. The member 104 is welded or otherwise rigidly secured to the member 103 and it has a tapped opening at the lower end thereof that is threaded loosely on a threaded upper end of the shaft 73. Thus the member 104 secures the member 103 to the shaft 73 permitting rotatable movement of the member 103 relative to the shaft 73. A spring 115 is supported at one end on a pin 117 that is rigidly secured to the manually operable member 103, and at the other end to a pin 119 that is rigidly secured to the link 65. The spring 115 biases the pin 119 into the notches 81, 107 of the members 79 and 103 respectively to provide a clutch connecting the drive arm 79 with the driving link 65 to thereby operatively connect the driven structure 71 with the driving structure 61.

As is best seen in FIG. 1, the cam-and-drive member 63 has a cam surface, one half of which comprises a lower cam surface 121 and the other half of which comprises a higher cam surface 123. A switch indicated generally at 125 is mounted on the plate 45 and has an actuating plunger 127 extending therefrom to be operated by means of a resilient arm 129 having a roller 131 at the free end thereof that is biased against the cam surface 121, 123. A terminal block 135 is provided for connecting the motor operating mechanism 7 in an electrical circuit.

The circuit interrupting apparatus 3 is shown in FIGS. 1–4 in the "off" or contact-open position. Referring to FIG. 3, when the circuit interrupting apparatus 3 is mounted and wired for operation, two lines L1 and L2 are connected to a suitable power source. In order to close the circuit breaker 5, a switch arm 141 of a switch 143 is moved out of engagement with a contact 145 and into engagement with a contact 147. This closes a circuit from L1, through the switch arm 141, the contact 147, a line L3, a contact 151 of the switch 125, a switch arm 153, a line L4, through the motor 49 to the line L2. This energizes the unidirectional motor 49 to rotate the shaft 57 to thereby rotate the cam-and-drive member 63 in a clockwise (FIG. 1) direction. This movement moves the link 65 (FIG. 1) downward and, because of the clutch connection effected by means of engagement of the pin 119 of the link 65 in the notch 81 (FIG. 7) of the drive arm 79, rotates the drive arm 79 in a clockwise direction about the pivot 73. Because of the friction coupling connection between the drive arm 79 and the connecting arm 85, rotation of the drive arm 79 effects rotation of the connecting arm 85 in a clockwise direction about the pivot 73 to thereby move the claw 87 to move the handle 13 of the circuit breaker 5 from the "off" to the "on" position to close the contacts of the circuit breaker 5.

Near the end of this operation, the roller 131 is moved off of the lower cam surface 121 onto the higher cam surface 123 whereupon the arm 129 of the switch 125 forces the plunger 127 inward to move the contact arm 153 (FIG. 3) out of engagement with the contact 151 and into engagement with the contact 159. This breaks the closing or "on" circuit deenergizing the motor 49, whereupon the braking action of the motor 49, gear box 53 and other moving parts of the circuit interrupting apparatus operate to bring the moving parts to a standstill. This movement of the switch arm 153 also operates an opening or "off" circuit.

Thereafter, if it is desired to open the circuit breaker 5, the switch arm 151 (FIG. 3) is operated out of engagement with the contact 147 and into engagement with the contact 153. This closes a circuit from the line L1, through the contact arm 141, the contact 145, a line L5, the contact 159, the contact arm 153, the line L4, the motor 49, to the line L2. This energizes the motor 49 to rotate the shaft 57 to thereby rotate the cam-and-drive member 63 clockwise. During this movement, the drive link 65 is moved upward (FIG. 1) to rotate the drive arm 79 (FIG. 7) counterclockwise and, because of the friction-coupling means connecting the drive arm 79 with the connecting arm 85, also rotate the connecting arm 85 counterclockwise whereupon the claw 87 moves the operating handle 13 from the "on" position to the "off" position to open the contacts of the circuit breaker 5. Near the end of this movement, the cam-and-drive member 63 is moved to position the roller 131 back on the lower cam surface 121 to release the plunger 127 (FIGS. 1 and 3) whereupon the plunger 127 moves back out moving the contact arm 153 (FIG. 3) out of engagement with the contact 159 and into engagement 151. This breaks the opening circuit deenergizing the motor 49 whereupon the drag of the motor, gears and other moving parts operates to brake and stop the moving parts. This movement of the switch arm 153 into engagement with the contact 151 also prepares the "on" or closing circuit for another operation.

When the circuit breaker 5 trips automatically in response to an overload current condition above a predetermined amount, the circuit breaker is reset by moving the switch arm 141 into engagement with the contact 145 to operate the motor operating mechanism 7 from the "on" to the "off" position to move the handle 13 of the circuit breaker to the "off" position to reset and relatch the circuit breaker mechanism. Thereafter, the circuit interrupting apparatus 3 can be operated in the same manner hereinbefore described.

In order to provide for effective operation when the motor operating mechanism is field mounted to operate a circuit interrupter, the linkage and parts of the motor operating mechanism are constructed so that the travel of the driven structure 71 is slightly more than the travel that is required to operate the interrupter from one to the other position. In order to provide for this over-travel and to avoid damaging the circuit breaker handle 13 that is stopped at each operating position, the friction coupling means slips to permit the drive arm 79 to move relative to the stopped handle 13 and connecting arm 85. Because the friction disc 91 is not attached to either of the members 85 or 79, the exact nature of how the clutch friction coupling means slips can vary. The disc 91 can move with the member 79, in which case the upper surface of the disc 91 would slip relative to the flat engaging surface of the connecting arm 85. The disc 91 could stop with the member 85 in which case the lower surface of the disc would slip against the flat engaging surface of the drive arm 79. Another possibility is that the disc could partially move with the member 79 in which case the upper and lower surfaces of the disc 91 would slip relative to the flat friction surfaces of both of the members 79 and 85. The friction surfaces of the members 79 and 85 are merely the flat portions of these metallic members that engage the friction disc 91. The friction disc 91 could be attached to either of the members 79 or 85; or the disc 91 could be eliminated and either of the members 79 or 85 could be formed with an asbestos or other suitable friction surface to provide a friction type coupling means.

The friction coupling means can be adjusted in order that there will be enough friction for effective operation; but not so much friction that the handle 13 will be broken or the motor 49 stalled during operation. The adjustment feature also provides that the motor operating mechanism 7 can be used with different circuit interrupters wherein a different amount of operating force may be required for effective operation. The adjustment is made by merely tightening or loosening the nut 95 (FIG. 2) to put either more or less compression on the spring washers 97 to provide more or less force biasing the members 79, 91, 85 together. It is well known that the amount of friction between engaging surfaces is proportional to the amount of force biasing the surfaces together. Thus, the friction of the coupling means can be adjusted to provide for positive action of the circuit interrupting apparatus when any one of a variety of different circuit interrupters are used in the combination.

Figure 9:
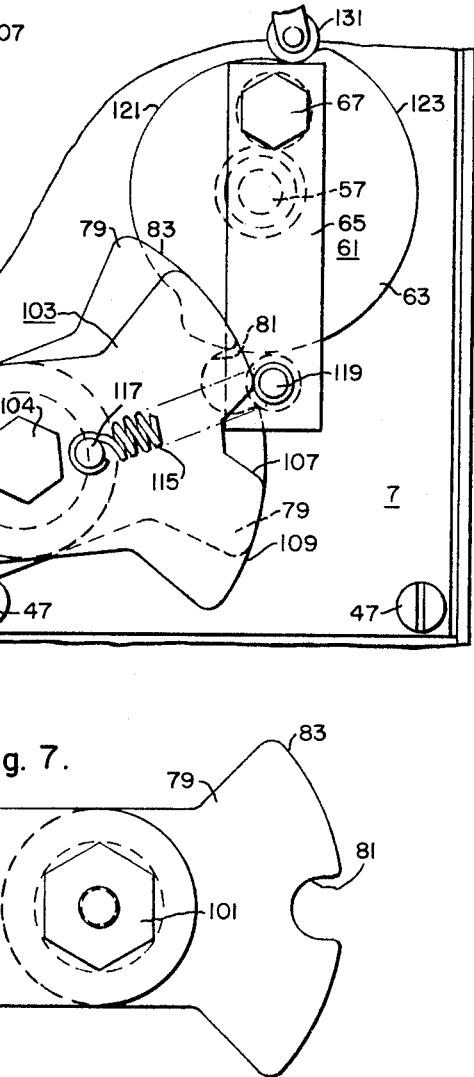
FIG. 9 is a partial plan view of parts of the apparatus seen in FIG. 1; the parts being shown in positions that are arrived at during a manual operation of the apparatus.

The circuit breaker 5 is manually operated by operation of the manual operating member 103 (FIGS. 1, 2 and 6). As was hereinbefore described, clutch means comprising the engagement of the lower part of the pin 119 of the link 65 in the notch 81 (FIG. 7) in the drive arm 79 serves as a driving connection between the driving structure 61 and the driven structure 71. The spring 115 biases the pin 119 into the notch 81 (FIG. 7) in the drive arm 79 and also into the notch 107 (FIG. 6) in the manually operable member 103. In order to manually operate the circuit breaker (for example from the "off" to the "on" position) a wrench or other suitable tool is connected to the nut portion 104 of the manually operable member 103 (FIG. 1) and the nut 104 is rotated clockwise to rotate the manually operable member 103 in a clockwise direction relative to the shaft 73. During the initial part of this movement, the pin 119 is cammed out of the slot 107 (FIG. 6) of the manually operable member 103 and onto the outer edge 109 of this member. This movement moves the lower part of the pin 119 out of the notch 81 (FIG. 7) in the drive member 79 to disengage the clutch connection between the link 65 and the drive member 79. During this clockwise motion of the manually operable member 103, and after the pin 119 has been cammed out of the slot 81 (FIG. 7) in the drive member 79, the pin 111 (FIG. 9) is engaged by the lower end of the slot 105 in the manually operable member 103, and, thereafter, further clockwise rotation of the member 103 moves the driven structure 71 (FIG. 7) as a unit in a clockwise direction independent of the disengaged driving structure 61 to thereby move the operating handle 13 of the circuit breaker from the "off" to the "on" position. Thus, it can be understood that during this continuous rotating operation of the member 103, the clutch 119, 81 is first disengaged, and thereafter the driven structure 71 is operated independently of the driving structure 61 to operate the circuit breaker.

If, after the circuit breaker 5 has been manually operated to the "on" position, it is desired to manually operate the circuit breaker back to the "off" position, the manually operable member 103 is rotated counterclockwise whereupon the pin 111 is first engaged at the upper end of the slot 105 and further counterclockwise movement of the member 103 moves the driven structure 71 counterclockwise to move the handle 13 back to the "off" position. At the end of this movement, the notch 81 is positioned adjacent the pin 119 and when the manually operable member 103 is released the spring 115 operates to return the member 103 to the position in line with the member 79 and to move the pin 119 back into the notches 81 and 107 to operatively connect the driving structure 61 with the driven structure 71.

If, after the circuit breaker 5 has been manually operated from the "off" to the "on" position, it is desired to operate the circuit breaker 5 to the "off" position by means of the motor operating mechanism 7, the motor operating mechanism 7 must be operated once to catch up to the position of the driven structure 71. When the driving structure 61 reaches the "on" position, the spring 115 will operate to move the pin 119 back into the notches 81 and 107. Thereafter, with the clutch 119, 81 engaged, the circuit breaker 5 can be operated by means of the motor operating mechanism 7 in the same manner hereinbefore described.

From the foregoing, it can be understood that there is provided by this invention an improved operating mechanism for operating circuit interrupters. The axes of the cam-and-drive member, the driven structure 71, and the manually operable member 103 are all disposed generally parallel to each other and generally perpendicular to the plane of the generally flat top planar surface of the housing 11 of the circuit breaker 5. Thus, these members comprise generally flat operating parts that move in planes that are generally parallel to the top planar surface of the housing 11 so that the operating mechanism can be conveniently mounted beside the breaker without extending substantially higher than the breaker. The friction-coupling means, which permits relative movement between the two parts of the driven structure, can be adjusted in order to provide enough friction for effective operation; but not so much friction that the handle 13 will be broken or the motor stalled during operation of the apparatus. The adjustment feature also provides that the motor operating mechanism can be used with different circuit interrupters that require a different operating force for effective operation. With the provision of friction coupling means the motor operating mechanism can be constructed to drive a greater distance than the handle travel of the circuit interrupter. Thus, the driving distance of the mechanism is less critical so that the mechanism can be field mounted to operate a variety of different circuit interrupters. The circuit breaker can be manually operated by means of a single continuous rotating movement of the manually operable member, which movement initially disengages a clutch to operatively disengage the driving structure from the driven structure and which movement thereafter moves the driven structure to operate the circuit breaker. The motor operating mechanism has been illustrated and described in combination with a molded-case type circuit breaker having an external operating handle. The mechanism has an additional advantage when used in this combination because it can be readily connected to the circuit breaker handle and, because when it is mounted beside the circuit breaker for operation, the motor operating mechanism is not substantially longer, wider, or higher than the circuit breaker. Thus, the combination can readily fit within a standard panelboard or enclosure without requiring any significant reconstruction of the panelboard or enclosure. It is to be understood, however, that the motor operating mechanism can also be advantageously used in combination with many other types of circuit breakers and switches, and also with various other forms of circuit interrupters.

While the invention has been disclosed in accordance with the provisions of the patent statutes, it is to be understood that various changes in the structure or details thereof may be made without departing from the spirit and scope of the invention. It is desired, therefore, that the language of the appended claims be given the broadest reasonable interpretation permissible in the light of the prior art.

We claim as our invention:

1. A motor operating mechanism for operating a circuit interrupter, said circuit interrupter having an operating member movable between two operating positions, said mechanism comprising a motor, a driving structure, means operatively connecting said driving structure with said motor, a driven structure adapted to be operatively connected to said operating member, clutch means operatively connecting said driving structure with said driven structure, and means manually operable with a continuous motion to disengage said clutch means and operate said driven structure independent of said driving structure to thereby operate said operating member from one to the other of said positions.

2. A motor operating mechanism for operating a circuit interrupter, said circuit interrupter having an operating member movable between two operating positions, said mechanism comprising a motor, a driving structure, means operatively connecting said driving structure with said motor, a driven structure adapted to be operatively connected to said operating member, clutch means operatively connecting said driving structure with said driven structure, upon energization of said motor said motor operating to drive said driving structure which driving structure operates through said clutch means to drive said driven structure to move said operating member from one to the other of said positions, and a manually operable structure rotatably supported and manually rotatable to disengage said clutch means and operate said driven structure independent of said driving means to thereby operate said operating member from one to the other of said positions.

3. A motor operating mechanism for operating a circuit interrupter, said circuit interrupter having an operating member movable between two operating positions, said mechanism comprising a motor, a driving structure, means operatively connecting said driving structure with said motor, a driven structure adapted to be operatively connected to said operating member, clutch means operatively connecting said driving structure with said driven structure, upon the energization of said motor said driving means operating through said clutch means to operatively move said driven structure to thereby move said operating member from one to the other of said operating positions, a manually operable cam member, lost-motion means operatively connecting said cam member to said driven structure, said cam member being manually operable with a continuous motion to cam said clutch to a disengaged position while said lost-motion is taken up and thereafter operatively move said driven structure independent of said driving structure to thereby effect a manual operation of said operating member from one to the other of said positions.

4. A motor operating mechanism for operating a molded-case type circuit breaker, said circuit breaker comprising an insulating housing and cooperable contacts disposed generally within said housing, said housing comprising a generally planar top wall having an opening therein, a handle extending out through said opening and being movable between two operating positions to open and close said contacts, said mechanism being adapted to be mounted beside said circuit breaker and comprising a motor, a driving structure rotatable about a first axis extending generally perpendicular to the plane of said top wall, a driven structure rotatable about a second axis generally parallel to said first axis, a clutch means operatively connecting said driving structure with said driven structure, upon energization of said motor said driving structure rotating about said first axis and operating through said clutch means to rotate said driven structure about said second axis to thereby move said handle from one to the other of said positions, a manually operable cam member rotatable about said second axis, lost-motion means operatively connecting said cam member with said driven structure, said cam member being manually rotatable with a continuous motion to cam said clutch to a disengaged position while said lost-motion is taken up and thereafter operatively rotate said driven structure to thereby move said handle from one to the other of said operating positions.

5. A motor operating mechanism for operating a molded-case type circuit breaker, said circuit breaker comprising an insulating housing and cooperable contacts disposed within said housing, said housing comprising a generally planar top wall having an opening therein, a handle extending out through said opening and being movable between two operating positions to open and close said contacts, said mechanism being adapted to be mounted beside said circuit breaker and comprising a motor, a driving structure, means operatively connecting said driving structure with said motor, said driving structure being rotatable about a first axis that extends generally perpendicular to the plane of said top wall, a driven structure rotatable about a second axis disposed generally parallel to said first axis, said driven structure being adapted to be operatively connected to said operating handle, clutch means connecting said driving structure with said driven structure, switch means operable to close a circuit to energize said motor to thereby rotate said driving structure which operates through said clutch means to rotate said driven structure to move said operating handle from one to the other of said positions, switch means automatically operated during said operation to deenergize said circuit, a manually operable member rotatable about said second axis with a continuous motion to disengage said clutch means and operate said driven structure independent of said driving structure to thereby move said operating handle to effect a manual operation of said circuit breaker.

6. A motor operating mechanism for operating a circuit interrupter, said circuit interrupter having an operating member movable between two operating positions, said mechanism comprising a motor, a driving structure, means operatively connecting said driving structure with said motor, a driven structure comprising a drive arm and a connecting arm, said connecting arm being adapted to be operatively connected to said operating member, friction-type coupling means operatively connecting said drive arm with said connecting arm, clutch means operatively connecting said driving structure with said drive arm, upon energization of said motor said driving structure operating through said clutch means to operate said driven structure to thereby operate said operating member from one to the other of said positions, said friction-type coupling means being adapted to slip to prevent the application of a damaging force to said operating member, and means manually operable with a continuous motion to disengage said clutch means and operate said driven structure independent of said driving structure to thereby operate said operating member.

7. A motor operating mechanism for operating a circuit interrupter, said circuit interrupter having an operating member movable between two operating positions and stop means stopping said operating member at each of said operating positions, said mechanism comprising a motor, a driving structure, means operatively connecting said driving structure with said motor, a driven structure adapted to be operatively connected to said operating member, clutch means operatively connecting said driving structure with said driven structure upon the energization of said motor said driving structure operating through said clutch means to operatively move said operating member from one to the other of said operating positions, said driven structure comprising two members, friction type coupling means comprising generally flat planar engaging friction surfaces operatively connecting said two members, when said operating member engages said stop means at said other operating position said friction type coupling means slipping to provide relative movement between said two members to thereby prevent the application of a damaging force to said operating member, means manually rotatable to disengage said clutch means and move said driven structure independent of said driving structure to effect a manual operation of said operating member.

8. A motor operating mechanism for operating a circuit interrupter, said circuit interrupter having an operating member movable between two operating positions and stop means stopping said operating member at each of said operating positions, said mechanism comprising a motor, a driving structure, means operatively connecting said driving structure with said motor, a driven structure comprising a drive member and a connecting member, clutch means operatively connecting said drive member with said driving structure, said connecting member being adapted to be operatively connected with said operating member, friction coupling means operatively connecting said drive member with said connecting member, upon energization of said motor said driving structure operating through said clutch means to operate said drive member which operates through said friction coupling means to operate said connecting member to thereby operate said operating member from one to the other of said positions, when said operating member engages said stop means at said other operating position said friction coupling means slipping to prevent the application of a damaging force to said operating member, means manually operable with a continuous rotational movement to disengage said clutch means and operate said driven structure independent of said driving structure to thereby operate said operating member from one to the other of said operating positions.

9. A motor operating mechanism for operating a molded case type circuit breaker, said circuit breaker comprising an insulating housing and cooperable contacts disposed within said housing, said housing comprising a generally planar top wall having an opening therein, a handle extending out through said opening and being movable between two operating positions to open and close said contacts, said mechanism being adapted to be mounted beside said circuit breaker and comprising a motor, a driving structure, means operatively connecting said driving structure with said motor, said driving structure being rotatable about a first axis extending generally perpendicular to the plane of said top wall, a driven structure rotatable about a second axis generally parallel to said first axis, said driven structure comprising a drive member and a connecting member, clutch means operatively connecting said driving structure to said drive member, said connecting member being adapted to be operatively connected to said operating member, friction-type coupling means operatively connecting said drive member with said connecting member, upon energization of said motor said driving structure operating through said clutch means to operate said driven structure to thereby move said operating handle from one to the other of said positions, said friction coupling means being adapted to slip when the torque required to move said connecting member exceeds a certain amount, a manually operable cam member rotatable about said second axis with a continuous motion to cam said clutch to a disengaged position and thereafter operatively move said driven structure to move said handle from one to the other of said operating positions.

10. A motor operating mechanism for operating a molded-case type circuit breaker, said circuit breaker comprising an insulating housing and cooperable contacts disposed within said housing, said housing comprising a generally planar top wall having an opening therein, a handle extending out through said opening and being movable between two operating positions to open and close said contacts, said mechanism being adapted to be mounted beside said circuit breaker and comprising a motor, a driving structure, means operatively connecting said driving structure with said motor, said driving structure being rotatable about a first axis, a driven structure comprising a drive member rotatable about a second axis generally parallel to said first axis, clutch means operatively connecting said driving structure with said drive member, said driven structure comprising a connecting member rotatable about said second axis and adapted to be operatively connected to said operating handle, friction coupling means operatively connecting said drive member with said connecting member, upon energization of said motor said driving structure rotating and operating through said clutch means to rotate said drive member about said second axis which movement operates through said friction coupling means to rotate said connecting member about said second axis to move said operating handle from one to the other of said operating positions, said friction coupling means slipping when said operating handle reaches said other position to prevent the application of a damaging force to said operating handle, a manually operable cam member rotatable about said second axis, lost-motion means operatively connecting said manually operable cam member with said driven structure, upon manual rotation of said cam member said cam member camming said clutch to a disengaged position while said lost motion is taken up and thereafter operatively moving said driven structure independent of said driving structure to thereby move said operating handle from one to the other of said positions.

References Cited by the Examiner
UNITED STATES PATENTS

| | | | |
|---|---|---|---|
| 2,068,402 | 1/37 | Duffing et al. | 200—92 |
| 2,228,466 | 1/41 | Ludwig, et al. | 200—92 |
| 2,872,545 | 2/59 | Hobbs | 200—92 |

BERNARD A. GILHEANY, *Primary Examiner.*
ROBERT K. SCHAEFER, *Examiner.*